Aug. 16, 1949.  F. S. STERNAD ET AL  2,479,027
DRUM COLLAPSING APPARATUS FOR TIRE BUILDING
Filed Aug. 7, 1947   3 Sheets-Sheet 1

Inventors
Frank S. Sternad
John P. Sapp

Aug. 16, 1949.    F. S. STERNAD ET AL    2,479,027
DRUM COLLAPSING APPARATUS FOR TIRE BUILDING
Filed Aug. 7, 1947    3 Sheets-Sheet 2
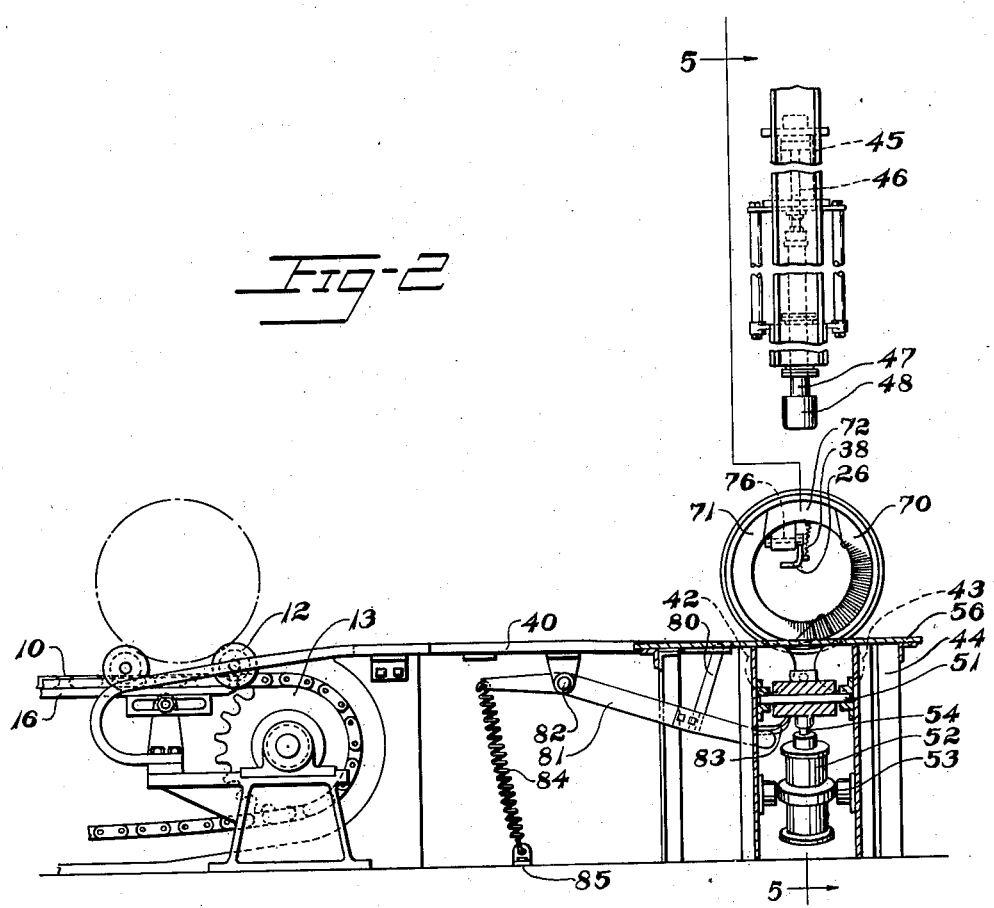
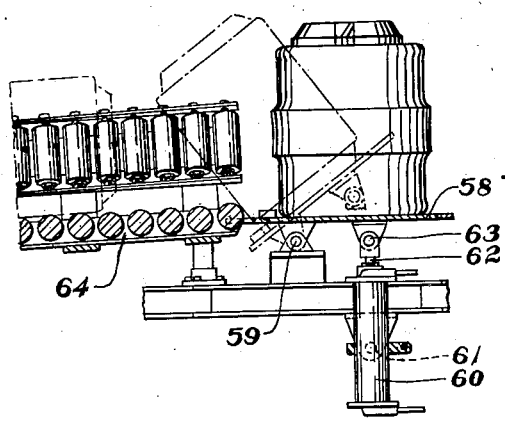
Inventors
Frank S. Sternad
John P. Sapp
By
Atty.

Aug. 16, 1949.                F. S. STERNAD ET AL                2,479,027
                     DRUM COLLAPSING APPARATUS FOR TIRE BUILDING
Filed Aug. 7, 1947                                        3 Sheets-Sheet 3
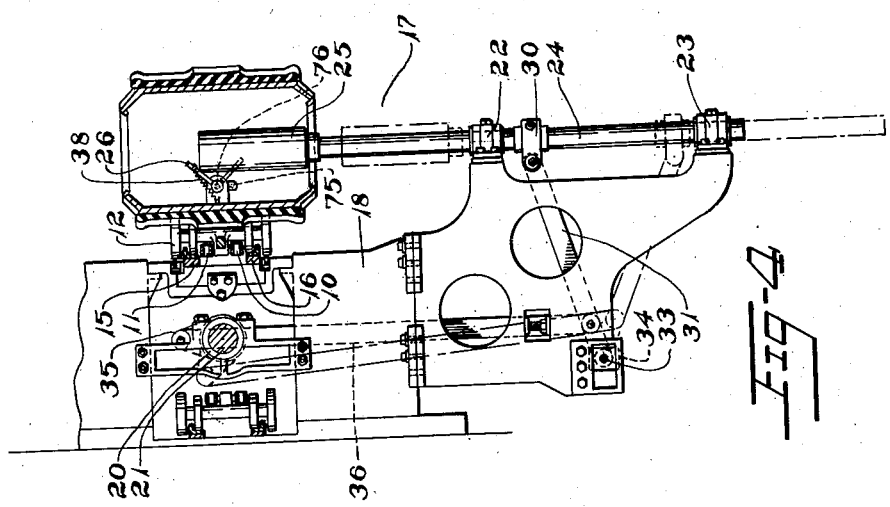
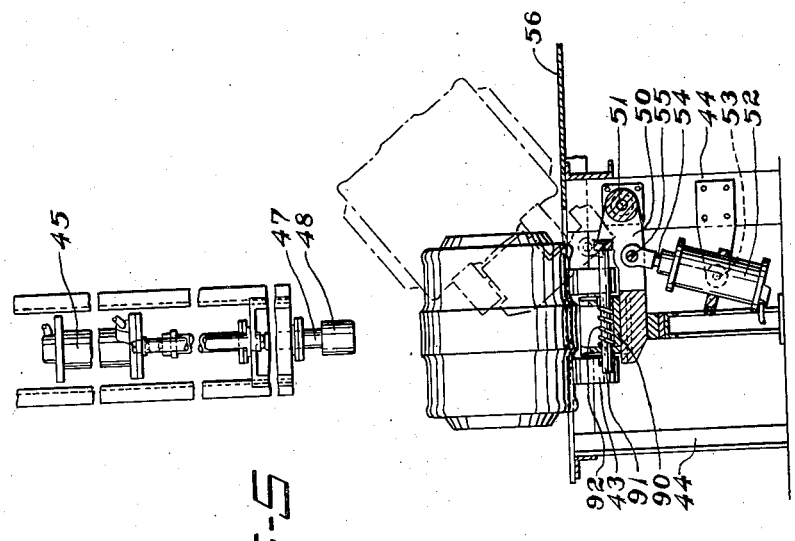
Inventors
Frank S. Sternad
John P. Sapp Patented Aug. 16, 1949

2,479,027

UNITED STATES PATENT OFFICE 2,479,027

DRUM COLLAPSING APPARATUS FOR TIRE BUILDING

Frank S. Sternad, Cuyahoga Falls, and John R. Sapp, Kent, Ohio, assignors to The B. F. Goodrich Company, New York, N. Y., a corporation of New York Application August 7, 1947, Serial No. 767,061

9 Claims. (Cl. 154—9)

1

This invention relates to apparatus for building pneumatic tires and is especially useful in collapsing the drums after the tire casing has been assembled thereon. The apparatus is especially useful in conjunction with machines such as that of our Patent No. 2,319,643 wherein a conveyor moves a series of drums step-by-step from one building station to another at which stations tire-building operations are performed on the drums.

Collapse of the drums is required to remove the completed tire bands whereupon resetting of the drums is effected for further use. Heretofore such collapsing and resetting operations, which are difficult and sometimes slow, have been performed entirely by hand.

It is an object of the present invention to provide for mechanical handling of the drums and mechanical collapse thereof.

Other objects are to relieve the operators from lifting the heavy drums, to provide for collapse of the drums in timed relation to the preceding tire building operations, to facilitate the band-removing and the drum-resetting operations, and to provide for facilitating the return of the empty drums to the machine.

These and other objects will appear from the following description and the accompanying drawings.

Of the drawings,

Fig. 2 is a sectional elevation thereof, taken on line 2—2 of Fig. 1.

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 2.

Figure 1:
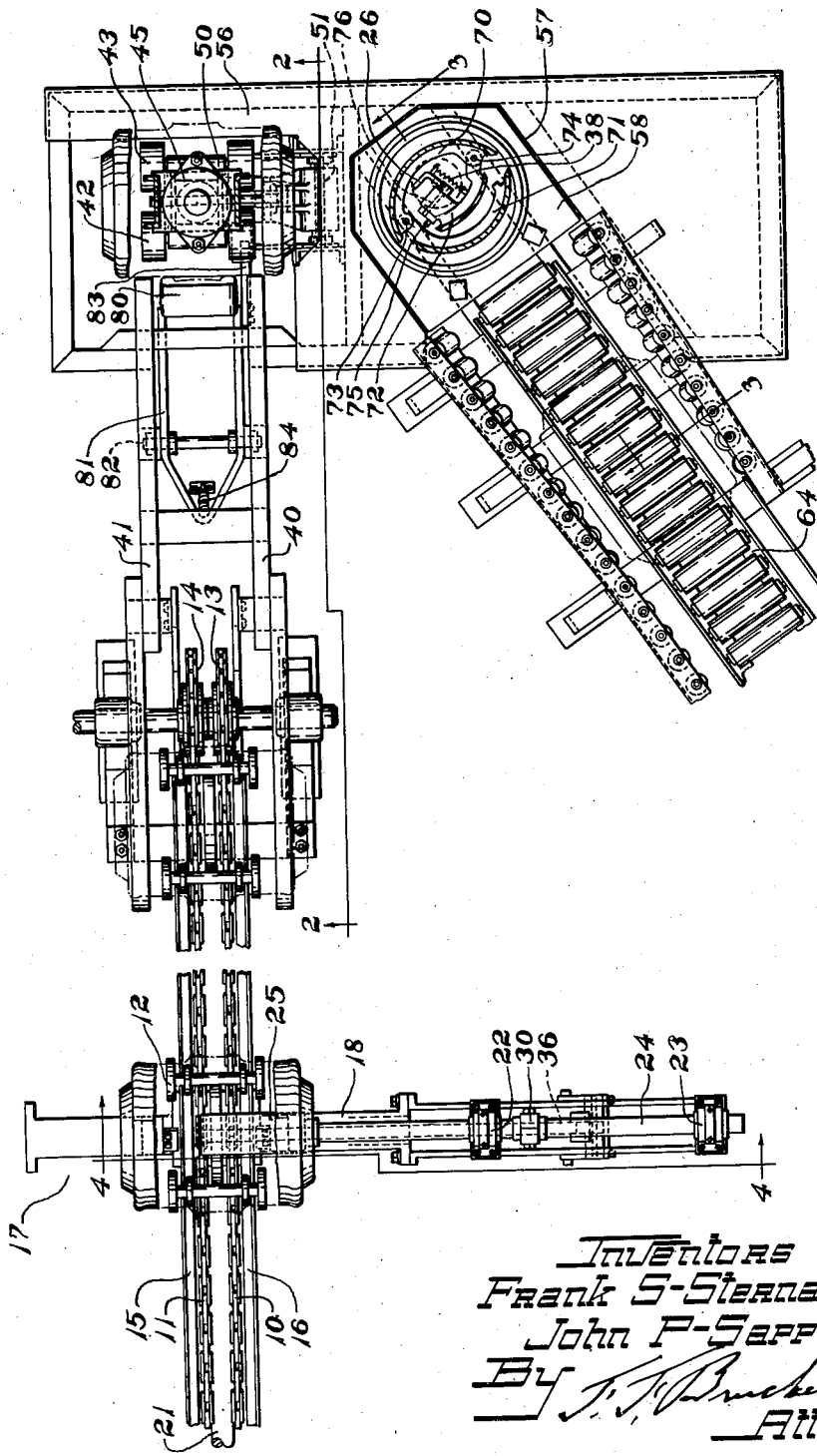
Fig. 1 is a plan view of apparatus constructed in accordance with and embodying the invention, parts being broken away.

Referring to the drawings, the numerals 10, 11 designate the conveyor chains of a tire-building machine such as that of our Patent No. 2,319,643 and the numeral 12 one of the drum-supporting carriages thereof which convey the drums from station to station. The chains pass about sprockets 13, 14 and the carriages are supported by guide 15, 16.

According to the present invention, an operating station 17 is supplied at a position near the

2 delivery end of the conveyor and spaced from the tire building stations of the machine by a distance equal to the spacing of the building stations. At this station mechanism is provided for unlatching the locked drum sections. A frame 18 provides a support for the rails 15, 16 and also a bearing 20 for the rock shaft 21. The frame 18 also has bearings 22, 23 in which a shaft 24 is slidably mounted for movement transversely of the conveyor. A plunger 25 is fixed to the shaft in a position to contact in its forward movement a latch handle 26 which locks the segments of the drum to each other. For moving the plunger, a shifter collar 30 on shaft 24 is pivotally connected to a shifter arm 31 pivotally secured at 32 to a block 34 slidably mounted vertically of the frame 18. An arm 35 is fixed to rock shaft 21 and is connected by a link 36 to shifter arm 31. The arrangement is such that, as described in the aforementioned patent, the rock shaft 21 is rotated at intervals, when the conveyor chains are idle and a drum is aligned with a station, to chuck the drums at the stations, and at the described station 17 the plunger advances and unlocks the drum, an over-center coil spring 38 being provided on the drum to hold the locking lever 26 in either a locked or unlocked position. The construction of a drum suitable for the purpose is described more fully hereinafter. The locked position of the lever 26 is indicated in dot-and-dash lines in Fig. 4 and is moved to the full line position with advance of the plunger 25 after a drum arrives at the station. Before the drum leaves the station, the plunger 25 is retracted to the dot-and-dash line position so that the drum may proceed past the station.

Beyond the station 17, a pair of runways 40, 41 are provided at the sides of the conveyor and the drum on the carriage 12 projects laterally over the runways which support it as the conveyor moves about the sprockets 13, 14.

At the end of the runways 40, 41 are a pair of rotatable cradle rolls 42, 43 supported by a frame 44. Above the cradle rolls is a fluid pressure operated cylinder 45, the piston rod 46 of which is connected to a vertically moveable ram 47 having a soft rubber head 48 for avoiding damage to the tire and the drum. The arrangement is such that the operator may roll the unlocked drum to a position over the cradle rolls and adjust it rotatably to a position where the ram 47 will strike the face of the drum at a position where the drum will collapse.

Cradle rolls 42, 43 are mounted on a swing frame 50 (see Fig. 5), pivotally mounted on frame 44, as at 51. A double-acting fluid pressure operated cylinder 52 is pivotally mounted, as at 53, to frame 44 and its piston rod 54 is pivotally connected to swing frame 50, as at 55. After the drum has been collapsed, fluid pressure is admitted to the lower end of cylinder 52 and raises swing frame 50 to the dot-and-dash position of Fig. 5 depositing the collapsed drum with its tire on end on a table 56. Table 56 has an opening 57 therein normally closed by a door 58 hinged to the frame at 59 (see Fig. 3). A double-acting fluid pressure operated cylinder 60 is pivotally mounted on the frame below the door, as at 61, and its piston rod 62 is pivotally connected to the door, as at 63. The operator slides the collapsed drum and the tire thereon to a position upon the door 58 where he lifts the tire from the drum. He then reforms the drum ready for reuse and by operating a hand controlled valve (not shown) admits fluid under pressure to the lower end of cylinder 60 tipping the door 58 to the dot-and-dash line position of Fig. 3 and depositing the drum on a conveyor 64 for delivery to the receiving end of the tire building machine.

The drum comprises three segments 70, 71, 72, segments 71 and 72 being hinged to segment 70 at 73, 74 respectively. Segment 72 carries a latch pin 75 fixed to a rock shaft 76 to which the lever 26 is fixed. Latch pin 75 is adapted to enter and leave a leg of an L-shaped slot in segment 71 when the drum is in collapsing position and to be thrown into the other leg of the slot in locked position, being held in either position by the spring 38. As the operator restores the drum to working condition he manipulates the lever 26 by hand to lock the segments together.

To provide against delivery of a succeeding drum to the cradle rolls 42, 43 while a drum positioned thereon is being upended by tipping of the cradle, a stop 80 is fixed to a lever 81 in the path provided by runways 40, 41. Lever 81 is pivotally mounted at 82 to the runway and has an end 83 extending under the cradle arm 50. The opposite end of lever 81 is connected to an end of an extension coil spring 84, the opposite end of the spring being secured to the floor at 85. The arrangement is such that when the cradle 50 is raised, the coil spring causes the stop 80 to raise above the runway due to the end 83 of arm 81 maintaining contact with cradle arm 50 under influence of the tensioned spring.

Cradle rolls 42, 43 are mounted for rotation upon a channel member 90 slidable lengthwise of the arm 50 on rods 91 but restrained to the left of Fig. 5 by coil spring 92. The arrangement is such that as the cradle arm rises, the rolls may move to the left under the weight of the tire and drum, cushioning somewhat the contact of the drum with the table.

In operation, the conveyor of the tire building machine delivers the drums one at a time to the station 17 where the plunger 25 advances and unlocks the drum. The drums are then conveyed to the runways 40, 41 and, when stop 80 is lowered, to the cradle rolls 42, 43 where the operator rotates the drum manually to a position where the segment 72 is uppermost. The operator then lowers the ram 47 to force segment 72 inwardly. Next the cradle is tipped to deposit the tire and drum on end on table 56. The assembly is then moved along table 56 to a position over door 58, the tire is lowered from the drum and lifted off. The drum is reformed and locked and the door 58 is tipped to deliver the drum to the conveyor 64.

Variations may be made without departing from the scope of the invention as it is defined by the following claims.

We claim:

1. Apparatus for building tires comprising a conveyor for moving a latched collapsible tire building drum step-by-step past a tire building station, said apparatus comprising a movable element at said station independent of said drum and engageable with the latch of said drum, and means at the station for moving said element to unlatch the drum on said conveyor.

2. Apparatus for building tires comprising a conveyor for moving a latched collapsible tire building drum step-by-step past a tire building station, said apparatus comprising a movable element at said station independent of said drum and engageable with the latch of said drum for unlatching a drum on said conveyor, said element comprising a plunger in alignment with the drum at said station, and means for advancing said plunger axially of the drum to throw the latch on said drum.

3. Apparatus for building tires comprising a conveyor for moving a latched collapsible tire building drum step-by-step past a tire building station, said apparatus comprising a movable element at said station independent of said drum and engageable with the latch of said drum, means at said station for moving said element to unlatch the drum on said conveyor, a runway in extension of said conveyor, a set of cradle rolls for receiving said drum, and means at said cradle rolls for radially collapsing said drum.

4. Apparatus for building tires comprising a conveyor for moving a latched collapsible tire-building drum step-by-step past a tire-building station, said apparatus comprising a movable element at said station independent of said drum and engageable with the latch of said drum, and means at said station movable crosswise of said conveyor for moving said element to unlatch the drum on said conveyor.

5. Apparatus for building tires comprising a conveyor for moving a latched collapsible tire building drum step-by-step past a tire building station, said apparatus comprising a movable element at said station engageable with the latch of said drum, means at said station for moving said element to unlatch the drum on said conveyor, a runway in extension of said conveyor, a set of cradle rolls for receiving said drum, and means at said cradle rolls for collapsing said drum, said cradle rolls being mounted for lateral rocking movement to upend said drum for removal of the tire therefrom.

6. A tire building machine comprising means for supporting a tire building drum with its axis extending in one direction, and means for tipping said support to deposit said drum with its axis perpendicular to the first said position of its axis.

7. A tire building machine comprising means for supporting a tire building drum with its axis extending in one direction, and means for tipping said support to deposit said drum with its axis perpendicular to the first said position of its axis, said supporting means comprising cradle rolls for supporting a drum for free rotation about its axis.

8. Apparatus for building tires comprising a conveyor for moving a latched collapsible segmental tire building drum step-by-step past a tire building station, a plunger slideably mounted coaxially with said drum at said station, a latch on said drum for holding its segments in annularly assembled relation, said latch extending inwardly of said drum and being in axial alignment with said plunger, and means for advancing and retracting said plunger axially of said drum to disengage said latch between movements of said conveyor.

9. Apparatus for building tires comprising conveyor means for moving a latched collapsible tire building drum, means for unlatching said drum, means for collapsing said drum, means for upending said drum to remove a tire band therefrom and means for depositing said drum on said conveyor means.

FRANK S. STERNAD.
JOHN P. SAPP.

REFERENCES CITED

The following references are of record in the file of this patent:

UNITED STATES PATENTS

| Number | Name | Date |
|---|---|---|
| 1,705,219 | Jenkinson | Mar. 12, 1929 |
| 1,854,813 | Swern | Apr. 19, 1932 |
| 1,860,342 | Heston | May 24, 1932 |
| 1,869,656 | Black | Aug. 2, 1932 |
| 2,319,643 | Sternad et al. | May 18, 1943 |
| 2,324,985 | Stevens | July 20, 1943 |
| 2,394,464 | McChesney | Feb. 5, 1946 |
| 2,395,020 | Sternad et al. | Feb. 19, 1946 |
| 2,413,010 | Teegarden | Dec. 24, 1946 |
| 2,445,728 | Stevens | July 20, 1948 |